Jan. 17, 1956  S. W. WILLIAMS  2,730,831
FISHING DEVICE
Filed July 2, 1953
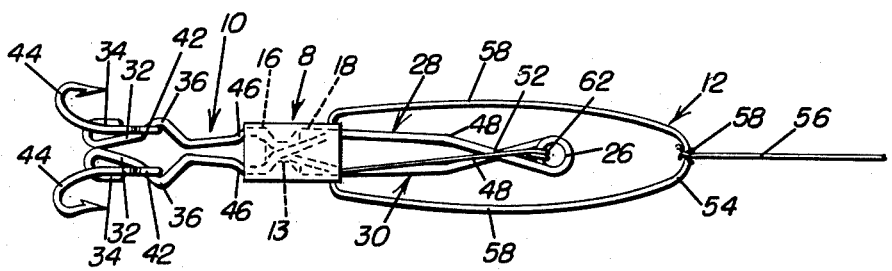
Fig. 1
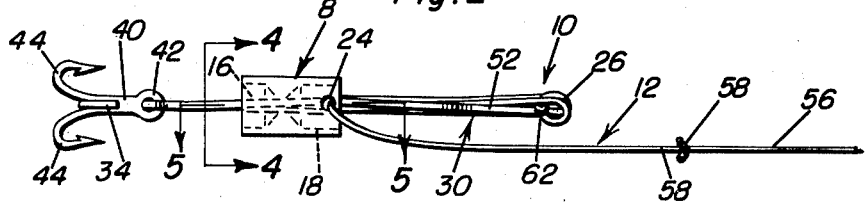
Fig. 2
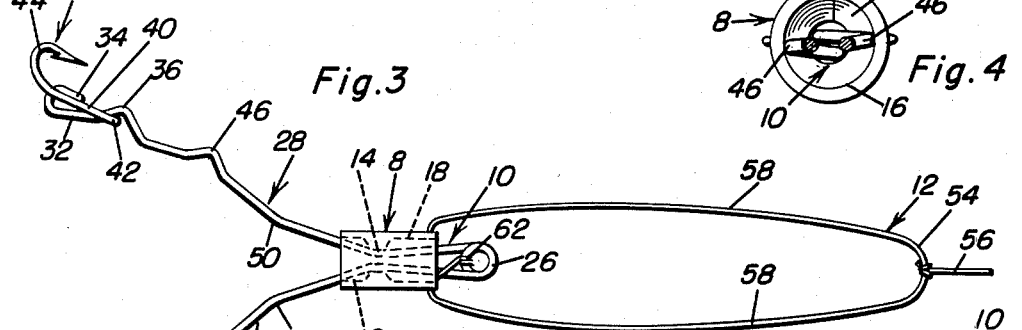
Fig. 3
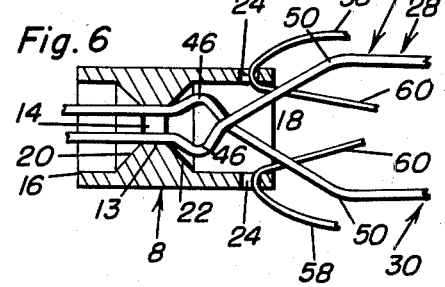
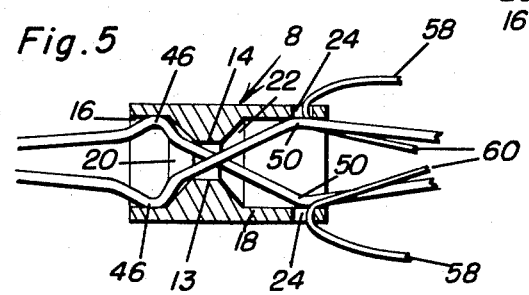
Sam W. Williams
INVENTOR.

United States Patent Office 2,730,831
Patented Jan. 17, 1956

2,730,831

FISHING DEVICE

Sam W. Williams, Normal, Ill.

Application July 2, 1953, Serial No. 365,664

1 Claim. (Cl. 43—36)

The present invention relates to a fishing device of the type classified in the category of fish hooks which are pull actuated and, of course, expansible when released and which, under the force of the impetus given hooks, the latter are forcibly embedded in the mouth of the fish, thus to bring about a reliable catch.

In carrying out the principles of the invention, a construction has been evolved and produced which is ideal for set lines and trot-lines, the construction being such that it is easy to set and bait, easy to retrieve from the mouth of the fish, safe to handle, long lasting, is such that the tension may be adjusted by the user, uses either live bait or artificial bait, requires no sinker, provides the often desired swivel action relieving the parts of destructive strain, provides for the use of replaceable hooks and may be made with inexpensive materials in keeping with the requirements of both manufacturers and users.

Another object of the invention is to provide a construction which functions properly to trap hard-to-catch fish due to the fact that the projectile-like hook-equipped expanding unit moves forwardly from a setting and holding sleeve into the mouth of the fish requiring the fish to bite first in order to bring about the relative pull between the fish on the one hand and the hand-held or controlled fishing line on the other hand, issuing a greater possibility of catching fish that bite easily on the first bite.

A further object has to do with a construction which is such that the fish cannot swallow the hooks, cannot easily spit or dislodge the hooks from its mouth, a construction in which a sinker is not ordinarily needed and in which there is little likelihood of the construction jamming and failing to function.

Then too, novelty is predicated on a construction which in case the device is accidentally tripped while in the water, the baited hooks are still available for continued fishing.

The construction is also such that it may be used at any depth from the bottom and on the surface of the water, may be used as a plug for casting or trolling, may be used on flies, requires no dip net or grappling hooks, minimizes the amount of equipment to be lugged about by the fisherman, has a double trigger action, easy for fish to trip and less likely to promote accidental tripping and embodies a construction which utilizes a safety set which will not accidently trip when put on "safety-set," whereby to permit the device to be reliably placed in and carried around in a tackle box.

Briefly summarized, the invention is characterized by an open-ended sleeve, a projectible and retractible unit slidably mounted in said sleeve, said unit embodying expansible and contractible arms joined with each other at corresponding ends by way of a coil spring, said arms having detents adapted to telescope into one end of said sleeve, whereby said arms are contracted, closely pressed together and are thus set, fishhooks secured to the free ends of said arms, a fishing line, and an operating connection between said line, sleeve, and unit, said connection being pull-actuated when the fishhooks are taken by the fish.

Novelty is also predicated on the structure above set forth wherein the operating connection is characterized by a flexible trip cord which provides a unique trigger action and wherein the cord is looped upon itself with the free ends passing through holes provided therefor in one end of the sleeve and then fastened to the stated coil spring, said line being connected to the bight portion of the cord.

Other objects, features, and advantages will become more readily apparent from the following description and the accompanying sheet of illustrative drawings.

In the drawings, wherein like numerals are employed to designate like parts throughout the views:

Figure 1 is a plan view of a fishing device constructed in accordance with the principles of the present invention and showing the device with the parts thereof set in their ready-to-trap position;

Figure 2 is a side view of the construction seen in Figure 1;

Figure 3 is a view on an enlarged scale based on Figures 1 and 2, and showing the relative position and relationship of the parts in the "after-the-strike" position;

Figure 4 is an enlarged section on the vertical line 4—4 of Figure 2, looking in the direction of the arrows;

Figure 5 is an enlarged fragmentary horizontal section on the line 5—5 of Figure 2, looking in the direction of the arrows; and Figure 6 is a view based on Figure 5 and showing the parts in what is referred to herein as the "safety set" position.

Referring now to the drawings with the aid of reference numerals and accompanying lead lines, it will be seen that, generally speaking, the over-all device is characterized by an open-ended sleeve 8 of appropriate length, cross-section and material, a projectible and retractible unit slidably mounted in the sleeve which unit is denoted as an entity by the numeral 10 and a trigger-action trip cord 12.

The sleeve is without spring means. It is a cylinder and of appropriate material and is provided on its interior with a partition 13 having a restricted concentric guide hole or opening 14 therein. The partition is spaced from the respective open ends of the sleeve and serves to divide the sleeve into an outward or forward chamber 16 and a rearward or inward chamber 18. The forward surface of the partition is beveled and conical, as at 20 and the rearward surface is likewise conically beveled as at 22. The right hand end of the wall of the chamber 18 is provided with diametrically opposite holes 24—24 which serve a purpose to be described. The orifice 14 serves as a guide for the unit 10 and the beveled surfaces 20 and 22 provide stop shoulders.

The projectible and retractible expanding unit 10 is preferably formed from stainless steel piano wire of appropriate gauge. The wire is bent upon itself between its ends to provide a double coil which is here referred to as a coil spring 26 and a pair of duplicate coplanar arms which are either close or spread apart, said arms being denoted by the numerals 28 and 30. The outer free end portions 32—32 of the arms are provided with return bends 34—34. Adjacent to these are outstanding V-kinks or humps 36—36 which are bait holders (dough being the bait usually employed) and which also serve as keepers for the fishhooks 38. Each hook is a double hook and has a shank 40 (see Figure 2) terminating in an eye 42. The spaced hooks 44—44 on the shank, define a crotch and the return bend 34 is engaged and resiliently held in the crotch and the eye 42 is thus bound in position in the keeper seat provided by the V-kink 36. This arrangement provides for readily attachable and detachable renewable hooks, hooks which may be varied in size but which are usually small, comparatively speaking. The intermediate portions of the respective arms are formed with a second pair of opposed humps or V-kinks 46—46 which are hereinafter described as detents. These detents are adapted to be normally friction-fitted in the chamber 16 in the manner best shown, for example, in Figures 1, 4, and 5, particularly Figure 5. Obviously, when the detents are in this set position the unit is releasably lodged in its ready-to-shoot position in the sleeve at which time the arms 28 and 30 are close together in the manner shown. Attention is directed to the fact that the arms are also provided with a pair of tension bends as at 48—48 which may be described as "first" bends and they are, in addition, provided with additional similar bends 50—50 which may be distinguished as a pair of "second" bends. All of these bends, of course, are important. The latter bends 48 and 50 are sometimes referred to as forward thrust and spread bends in that they function to cause the arms to be crossed as at 52 in the set position in Figure 1. The coil spring acts as the principal spring means, a swivel, hook-retrieving handle and an attaching eye for the trip cord, in a manner to be described.

Attention is invited to Figures 5 and 6 at this time, in order to emphasize the fact that the detents 46—46 are frictionally lodged in the pocket or chamber 16 when the unit 10 is set and ready for the catch. The safety set position is shown in Figure 6 wherein it is necessary to catch hold of the handle-forming coil spring 26 and to pull the detents through the restricted guide opening 14. When the detents are thus located in the chamber 18, the device will not, of course, operate. That is to say, the unit 10 is thus temporarily "locked" with the sleeve unit 8 providing the stated "safety-set" position.

The trigger-action trip cord or means 12 comprises a length of appropriate flexible material, the bight portion of which is denoted at 54 with the fishing line 56 tied thereto, as at 58. The reaches or portions 58—58 are slidingly joined with the sleeve. This is accomplished by threading the end portions 60—60 through guide holes 24—24 and then tying the extremities to the coil spring as shown at 62. With respect to the guide opening 14, it is to be pointed out that this is a restriction for freeing each arm of the wire unit from excessive friction and the beveled surfaces 20 and 22 serve to provide the cam action which comes about when the detents 46—46 are pulled through the restricted guide opening 14 from the position shown in Figure 5 to that shown in Figure 6.

The construction herein disclosed provides a fishing device for feasible and practicable use by anglers, a device which is compact and convenient, is economical and includes the many advantages and features heretofore related and obvious by taking into account the significance of the specially constructed sleeve, projectible and retractible unit 10, and unique and reliable trip cord 12.

It is repeated that Figures 1 to 4, and 5, show the relationship of the several units when the device is set and ready for use. Figure 3 shows the manner in which the projectible and retractible unit 10 is spread or sprung and how the fishhooks would be forcibly expanded and lodged in the mouth of the fish when the device is in its release position. Figure 6 brings out clearly the "safety set" position and relationship of parts.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A fishing device comprising an open-ended sleeve, a projectible and retractible unit slidably mounted in said sleeve, said unit embodying expansible and contractible arms joined with each other at corresponding ends by way of a coil spring, said arms having detents adapted to telescope into one end of said sleeve, whereby said arms are contracted, pressed closely together and are thus set, fishhooks secured to the free ends of said arms, a fishing line, and an operating connection between said line, sleeve, and unit, said connection being pull-actuated when the fishhooks are taken by the fish, said sleeve provided interiorly and between its respective ends with a partition dividing said sleeve into outward and inward selectively usable chambers, said detents being confined in said outward chamber when the unit is set for releasing and being moved to and confined in said inward chamber when said unit is in its "safety" non-trippable position, said detents comprising V-shaped kinks in opposed relation, the vertices of said kinks facing in directions away from each other, said partition having a concentric guide opening of restricted size and the outward and inward surfaces of said partition having conical recesses defining cam faces which serve to press the detents and arms toward each other as the arms are forcibly slid through said guide opening to allow the detents to be retentively lodged in either chamber.

References Cited in the file of this patent

UNITED STATES PATENTS

| Number | Name | Date |
|---|---|---|
| 129,053 | Pitcher | July 16, 1872 |
| 534,694 | Kienle | Feb. 26, 1895 |
| 616,924 | Heberling | Jan. 3, 1899 |
| 618,764 | Anderson | Jan. 31, 1899 |
| 807,135 | Smith | Dec. 12, 1905 |
| 2,247,806 | Foley | July 1, 1941 |